United States Patent [19]

Coops et al.

[11] Patent Number: 4,908,506

[45] Date of Patent: Mar. 13, 1990

[54] APPARATUS FOR OPTICALLY SCANNING A RADIATION-REFLECTING INFORMATION PLANE

[75] Inventors: Peter Coops; Adrianus J. Duijvestijn, both of Eindhoven, Netherlands

[73] Assignee: U.S. Philips Corporation, New York, N.Y.

[21] Appl. No.: 323,466

[22] Filed: Mar. 14, 1989

[30] Foreign Application Priority Data

Nov. 3, 1988 [NL] Netherlands ............... 8802689

[51] Int. Cl.$^4$ .............................. G01J 1/20
[52] U.S. Cl. ................... 250/201.5; 369/46
[58] Field of Search ........... 250/201 AF, 204, 201 R, 250/201 DF, 201 P, 216; 369/44, 45, 46

[56] References Cited

U.S. PATENT DOCUMENTS 4,363,962  12/1982  Shida ................ 250/201 AF
4,725,725  2/1988  Andō ................ 250/216

Primary Examiner—David C. Nelms
Assistant Examiner—William Oen
Attorney, Agent, or Firm—A. Tamoshunas; Leroy Eason

[57] ABSTRACT

Optical scanning apparatus which includes a diode laser producing a radiation beam which is focussed by a lens system on a reflecting information plane to be scanned thereby. The reflected radiation is diffracted by a composite diffraction grating which includes a pair of sub-gratings, forming respective radiation spots on respective pairs of radiation detectors. The detectors in each pair are separated by a separating strip, the separating strips being substantially parallel to or co-linear with the bonding line between the sub-gratings. Such arrangement achieves correction for wavelength variations of the radiation beam, as well as fairly wide tolerances in the relative positioning of the various optical elements of the apparatus.

6 Claims, 6 Drawing Sheets

APPARATUS FOR OPTICALLY SCANNING A RADIATION-REFLECTING INFORMATION PLANE

BACKGROUND OF THE INVENTION

1. Field of the Invention

The invention relates to an apparatus for optically scanning a radiation-reflecting information plane, which apparatus comprises a diode laser supplying a scanning beam, an objective system for focusing the scanning beam to a scanning spot in the information plane and for re-imaging the scanning spot on a composite radiation-sensitive detection system, and a composite diffraction grating arranged in the radiation path between the diode laser and the objective system for deflecting the radiation reflected by the information plane towards the radiation-sensitive detection system and for splitting the diffracted beam into a plurality of sub-beams forming a corresponding plurality of radiation spots re-imaged on a corresponding plurality of detector pairs of the composite detection system. The separating strip between the two detectors of each one detector pair has an orientation such that displacements of the re-imaged radiation spots resulting from wavelength variations of the scanning beam do not have any influence on the detector signals.

2. Description of Related Art

An apparatus of this type, which is in principle suitable for reading information recorded in an optical record carrier and for optically inscribing such a record carrier, is known from U.S. Pat. No. 4,665,310. In this apparatus the composite diffraction element, in the form of a diffraction grating, fulfils two functions for which otherwise two separate elements must be used. In the first place the grating ensures that the radiation reflected by the information plane and passing through the objective system is diffracted from the path of the radiation emitted by the diode laser so that a detection system can be placed in the path of the reflected radiation. In the second place the grating splits the reflected beam into two sub-beams which are required for generating a focusing error signal, i.e. a signal comprising information about the magnitude and the direction of a deviation between the focusing plane of the objective system and the information plane. A separate detector pair is associated with each sub-beam, the difference between the output signals of the detectors associated with the same pair being a measure of the degree of focusing of the scanning beam on the information plane.

In the said record carrier the information is arranged in accordance with information tracks. If the bounding line between the two sub-gratings is parallel to the track direction, a signal comprising information about the magnitude and direction of a deviation between the centre of the scanning spot and the centre line of the information track to be scanned can be obtained by determining the sum of the output signals of each detector pair and by subtracting these sum signals from each other.

To realise the desired beam splitting, the diffraction grating of the apparatus according to U.S. Pat. No. 4,665,310 comprises two sub-gratings having the same grating period, while the grating strips of the first sub-grating extend at a first angle and the grating strips of the second sub-grating extend at a second angle, which is equal but opposite to the first angle, to the bounding line between the two sub-gratings. Since a diffraction grating diffracts an incident beam in a plane transversely of the direction of the grating lines, the beam portion incident on one of the sub-gratings will be diffracted in a different direction than the beam portion incident on the second sub-grating.

As described in U.S. Pat. No. 4,665,310 the grating design therein is based on a previously proposed composite diffraction grating. The latter composite grating comprises two sub-gratings in which the grating strips of the one sub-grating have the same direction as those of the other sub-grating, but in which the grating periods of the two sub-gratings are different. Since the angle at which an incident beam is diffracted by a grating depends on the grating period, the beam portion incident on one of the sub-gratings is diffracted at a different angle than the beam portion incident on the other sub-grating.

Satisfactory experience has been gained with scanning apparatuses comprising these gratings. However, it has been found that when using a grating a deviation in the generated focusing error signal may occur due to a variation in the wavelength of the scanning beam. It is true that this deviation can remain within the range of tolerance laid down for the focusing error signal, but it leaves only little room for possible other deviations. The last-mentioned deviations may occur, for example, due to assembly errors, movements of the optical components with respect to one another or offsets in the electronic processing circuit.

As is known, the wavelength $\lambda$ of the radiation beams emitted by diode lasers, which are often used in practice, may vary, for example due to temperature variations. Furthermore, the wavelengths of individual diode lasers, which have been manufactured at different instants while using the same process, may be mutually different. A wavelength variation of the scanning beam results in a change of the angles at which the sub-beams are diffracted by the sub-gratings, resulting in a change of the positions of the radiation spots on the detector pairs.

To prevent these changes in position from affecting the generated focusing error signal, it has been proposed to arrange the separating strip of each detector pair in such a way that the displacement of the radiation spots due to the wavelength variations occurs along these separating strips.

In the apparatus described in U.S. Pat. No. 4,665,310 these strips are effectively, that is to say when projected on the composite grating, transverse to the grating lines of the associated gratings. If the detector pairs are located on one side of the optical axis of the objective system, and in a plane which is perpendicular to this optical axis and coincides with or is parallel to the radiation-emitting surface of the diode laser, the separating strips will extend at equal but opposite angles $(+\phi, -\phi)$ to the line which connects the centre of the two detector pairs to the centre of the radiation-emitting surface of the diode laser. Such measure can also be employed in an apparatus comprising a diffraction grating whose sub-gratings have different grating periods, the directions of the grating strips of the two sub-gratings being the same.

When using a composite detector with oblique separating strips, the distance, measured along the said bounding line, between the centre of the two detector pairs and the centre of the radiation-emitting surface of the diode laser must be adjusted very accurately.

SUMMARY OF THE INVENTION

It is an object of the present invention to provide an apparatus of the type described in the opening paragraph which is corrected for wavelength variations and which provides wider tolerances for the positions and parameters of the optical elements, as compared with other apparatuses.

The apparatus according to the invention is characterized in that the separating strips of the detector pairs are substantially parallel to a line which connects the centre of the radiation-emitting surface of the diode laser to the centre of the composite radiation-sensitive detection system.

The present invention is based on a novel design concept for the said scanning apparatus. Hitherto, an end configuration relating to the positions and the parameters of the elements of the apparatus, with the exception of the composite detector, was chosen and a composite detector was then designed with such a geometry, notably such an angle $\phi$ of the separating strips, that the apparatus was corrected for wavelength variations. The apparatus according to the present invention is designed by firstly designing a composite detector with a given geometry, starting from a rough set-up of the apparatus, which detector is optimized for wavelength variations and position tolerance. Subsequently the design of the apparatus is finished, using the wider tolerances provided by the composite detector for the other parameters, notably the position of various optical elements.

The invention can be used in scanningg apparatuses in which the diffraction element is constituted by a grating comprising a plurality of sub-gratings.

The sub-gratings may have straight grating strips and a constant grating period.

Preferably, the apparatus is, however, further characterized in that the sub-gratings have a varying grating period and in that the grating strips are curved.

When using a diffraction grating having a varying grating period, less stringent requirements need to be imposed on the accuracy of positioning the diode laser relative to the detectors in the form of photodiodes, which is particularly important if the height of the apparatus, measured along the optical axis of the objective system must be reduced. Moreover, when using gratings with curved grating strips, it is possible to correct for imaging errors such as coma and astigmatism by adapting the curvatures of the composite grating, which errors may occur when using a diffraction grating with straight grating strips.

A preferred embodiment of the apparatus is characterized in that the two sub-gratings have the same average grating period, while the main directions of the grating strips of the first sub-grating extend at a first angle and those of the grating strips of the second sub-grating extend at a second, opposite angle to the bounding line the two sub-gratings, and in that the detector pairs are juxtaposed in a direction transversely of the direction of the said bounding line.

A second embodiment of an apparatus, in which the composite grating comprises two sub-gratings, is characterized in that the grating strips of the one sub-grating have the same main direction as those of the other sub-grating, the average grating periods of the sub-gratings are different, the detector pairs are juxtaposed in a direction parallel to the bounding line between the sub-gratings and the separating strips of the detector pairs are located on the said connection line.

This embodiment is not complete, but to a great extent, corrected for variations in the wavelength of the scanning beam, which may be sufficient under circumstances. For a full correction, the separating strips of the detector pairs must extend at equal but opposite angles of the order of 0.1° to the said connection line. This situation is considered to be within the concept that the separating strips of the detector pairs are substantially parallel to the connection line.

A third embodiment of the apparatus is characterized in that the main directions of the grating strips of the first sub-grating extend at a first angle and those of the grating strips of the second sub-grating extend at a second, opposite angle to the bounding line between the sub-gratings, the average grating periods of the two sub-gratings are different, and the detector pairs occupy different positions in a direction which is both parallel and perpendicular to the said bounding line.

BRIEF DESCRIPTION OF THE DRAWINGS

Embodiments of the invention will now be described in greater detail with reference to the accompanying drawings in which.

DESCRIPTION OF THE PREFERRED EMBODIMENTS

Figure 1:
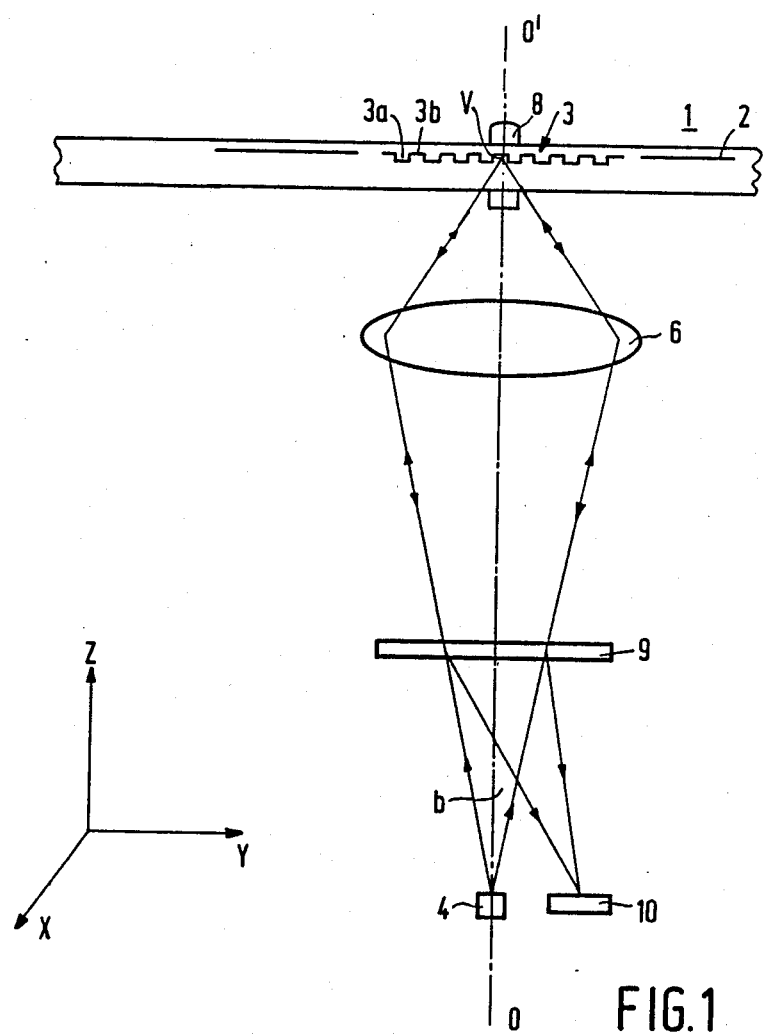
FIG. 1 shows diagrammatically an embodiment of a read apparatus comprising a diffraction grating.

In FIG. 1 a small portion of an optical record carrier 1 with a radiation-reflecting information plane 2 is shown in a tangential section. This Figure shows one of the tracks 3 located in the information plane 2. Such a track comprises information areas 3a alternating with intermediate areas 3b. The areas 3a may for example be located at a different height than the intermediate areas 3b. The information surface is scanned by a beam b emitted by a diode laser 4. This beam is focused to a small scanning spot V in the information plane by an objective system 6, schematically represented by a single lens. The objective system may be integrated with a collimator lens, as is shown in FIG. 1. Alternatively, a separate collimator lens may be arranged in front of the objective system. As the record carrier is rotated about an axis 8, which is parallel to the optical axis 00', a track 3 is scanned and the read beam is modulated by the information contained in this track. The entire information surface is scanned by moving the record carrier and the read head, comprising the source 4, the objective system 6 and the detection system 10, in a radial direction, or X direction relative to one another.

The beam which has been reflected and modulated by the information surface should be detected, so that this beam must be separated from the ongoing beam. Therefore, the apparatus should comprise a beam-separating element.

For reading an information structure with minute information details, for example of the order of 1 μm, an objective system having a large numerical aperture is required. The depth of focus of such an objective system is small. Since variations in the distance between the information plane 2 and the objective system 6 may occur which are larger than the depth of focus, steps have to be taken in order to detect these variations and, in response thereto, correct the focusing. To this end the apparatus may be provided with a beam splitter 9 which splits the reflected beam into two sub-beams, and with, for example, two detector pairs a first pair of which cooperates with the first sub-beam and the second pair cooperates with the second sub-beam. The output signals of the detectors are processed to form, inter alia, a focus-servo signal.

As described in the Article "optische Fokusfehlerdetektion" in "Neues aus der Technik", No. 6, Dec. 15, 1980, page 3, beam separation and beam splitting can be effected by means of a single element, namely a transparent grating. This grating splits the beam reflected by the information plane 2 and passing through the objective system 6 into a non-diffracted zero-order sub-beam and a plurality of first-order nd higher order sub-beams. One of these beams, preferably a first-order sub-beam, is incident on the radiation-sensitive detection system 10 and is used for generating, inter alia a focusing error signal. The grating parameters, notably the ratio between the width of the grating strips and that of the intermediate grating strips and the depth and the shape of the grating grooves, may be chosen to be such that a maximum quantity of radiation reaches the detection system.

Figure 2:
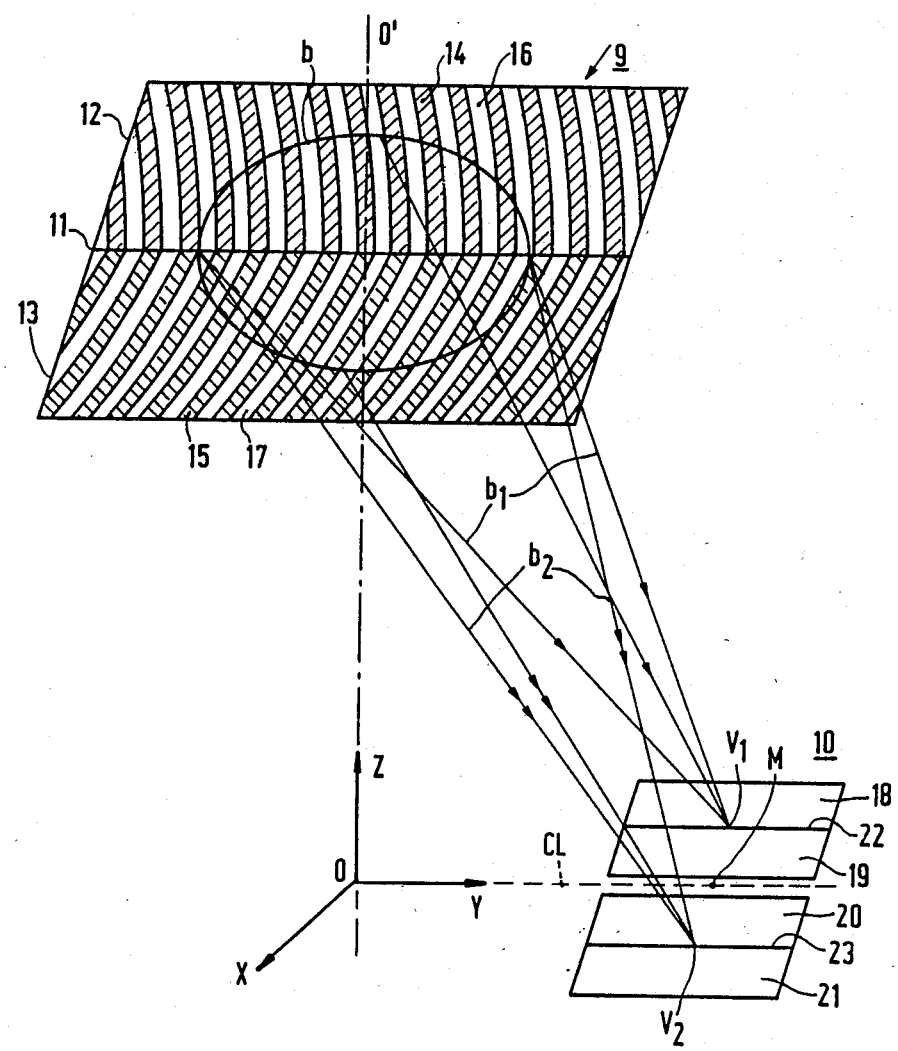
FIG. 2 is a perspective diagrammatical view of a first embodiment of the detection system according to the invention and the associated diffraction grating.

FIG. 2 shows in a perspective elevational view a first embodiment of the radiation-sensitive detection system 10 according to the invention and the associated grating. The beam b is shown by way of its cross-section at the area of the grating 9. This grating 9 comprises two sub-gratings 12 and 13 separated from each other by the bounding line 11. The grating strips of the sub-gratings are denoted by the reference numerals 14 and 15, respectively. These grating strips are separated by intermediate strips 16 and 17. In this embodiment the sub-gratings have the same grating periods, but the main directions of the preferably curved grating strips 14 of the sub-grating 12 extend at a first angle to the bounding line 11, while the main directions of the curved grating strips 15 of the second sub-grating 13 extend at a second, preferably equally large but opposite angle to the bounding line. The sub-beams are substantially diffracted in a direction transversely of the main directions. Since the main directions are different, the sub-beams $b_1$ and $b_2$ are diffracted at different angles in the XZ plane. This means that in the plane of the detectors, the XY plane, the radiation spots $V_1$ and $V_2$ are displaced relative to each other in the X direction. In this Figure and in the other Figures the references X, Y and Z are the axes of a system of coordinates whose origin 0 coincides with the centre of the radiation-emitting surface of the diode laser 4.

Figure 3A:
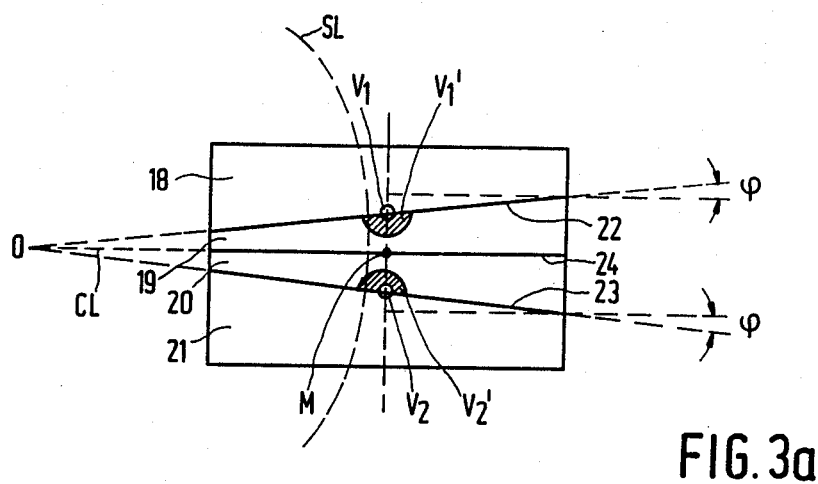
FIGS. 3a and 3b show the variations of the radiation spots in a known detection system when focusing errors occur.
Figure 3B:
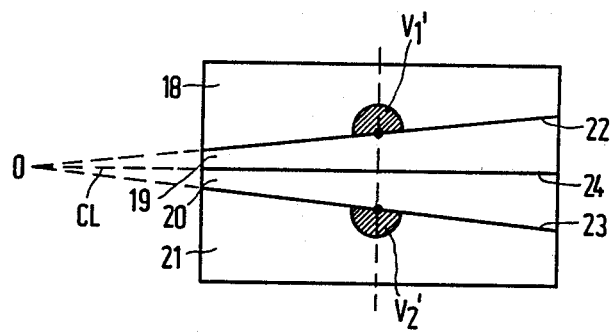

Radiation-sensitive detectors in the form of photodiodes 18, 19 and 20, 21 which are separated by narrow strips 22 and 23 are associated with each of the sub-beams $b_1$ and $b_2$, respectively. These detectors are positioned in such a way that in the case of a correct focusing of the beam b on the information plane 2 the intensity distribution of the radiation spots $V_1$ and $V_2$ formed by the sub-beams $b_1$ and $b_2$ is symmetrical relative to the detectors 18, 19 and 20, 21, respectively. When a focusing error occurs, the radiation spots $V_1$ and $V_2$ will become asymmetrically larger, as is shown in FIGS. 3a and 3b. These Figures show a known composite detector, i.e. a detector whose separating strips 22 and 23 extend at an angle $+\phi$ and $-\phi$, respectively, to the connection line CL between the point 0 and the centre M of the composite detector 10, which connection line coincides with the separating strip 24 between the detector pairs 18, 19 and 20, 21 in FIGS. 2 and 3. In FIG. 3a shows the situation when the focus of the beam b is in a plane in front of the information plane 2, while FIG. 3b relates to the situation when the focus of the beam b is in a plane behind the information plane.

If the output signals of the detectors 18, 19, 20 and 21 are represented by $S_{18}$, $S_{19}$, $S_{20}$ and $S_{21}$, respectively, the focusing error signal $S_f$ will be given by:

$$S_f = (S_{18} + S_{21}) - (S_{19} + S_{20}).$$

A signal which is proportional to the information being read, or the information signal $S_i$ is given by:

$$S_i = S_{18} + S_{19} + S_{20} + S_{21}.$$

If the bounding line 11 of the two sub-gratings 12 and 13 is parallel to the direction of a track 3 being read, it is also possible to generate a tracking error signal $S_r$ by means of the detector signals. This signal is given by:

$$S_r = (S_{18} + S_{19}) - (S_{20} + S_{21}).$$

The apparatus can be dimensioned such and the geometry of the composite grating and the wavelength of the scanning beam can be adapted to one another in such a manner that the sub-beams $b_1$ and $b_2$ are focused on the separating strips of the photodiode pairs 18, 19, 20 and 21 if the plane in which the scanning beam b is focused coincides with the information plane 2. Then the magnitude of the radiation spots $V_1$ and $V_2$ is minimal and the intensity distribution of each spot is symmetrical relative to the associated detector pair.

When varying the wavelength of the scanning beam, the angles at which the sub-beams are diffracted by the sub-gratings will vary. This means that for each sub-beam the position in which the chief ray of this sub-beam is incident on the associated photodiode pair is displaced. To ensure that this displacement of the chief ray does not have any influence on the focusing error signal, it is already ensured in the known apparatuses that this displacement occurs along the separating strips 22 and 23 of the detector pairs. In a previously proposed embodiment separating strips 22 and 23 therefore extend at such an angle $+\phi$ and $-\phi$ to the connection line between the points M and 0 that the extensions of the separating strips intersect each other at the optical axis 00' as is shown in FIGS. 3a and 3b. For the sake of clarity the angles $\phi$ are exaggerated in these Figures. If the plane of the composite detector coincides with the radiation-emitting surface (XY) of the diode laser 4, these extensions intersect each other at the point 0.

If the separating strips extend at an angle $\phi$ to the connection line CL, the position of the composite detector in the Y direction should be adjusted accurately. When the distance $Y_d$ between the points M and 0 varies the positions of the separating strips relative to the radiation spots $V_1$ and $V_2$ also vary so that such a variation will influence the focusing error signal. It is true that, when using a composite grating 9 with curved grating strips, the positions of the radiation spots $V_1$ and $V_2$ can be corrected by displacing this grating but such a correction can only be carried out to a limited extent.

Moreover, when using a composite detector 10 with oblique separating strips, stray light, which may be produced in the apparatus by, for example, false reflections, may affect the different detector signals in an unequal manner so that the focusing error signal being derived is influenced by this stray light. Such a beam of stray light will in fact be incident on one part, for example the left-hand part of the composite detector 10, as is illustrated by means of the broken-line arc of a circle SL in FIG. 3a. The portions of the separate detectors located within this arc of a circle have different sizes so that the stray light contributions to the detector output signals will be different for the different detectors.

Furthermore, if the separating strip 22, 23 in a detector pair 18, 19; 20, 21 varies in such a way that the detectors of this pair have unequal sizes, not only a first zero which corresponds to the desired focusing may be produced in the curve representing the variation of the focusing error signal as a function of the focusing error, but also a second zero may be produced which does not correspond to the desired focusing. Then there is a risk that the focus-servo system of the apparatus adjusts the focus of the scanning beam above or below the information plane 2.

Figure 4:
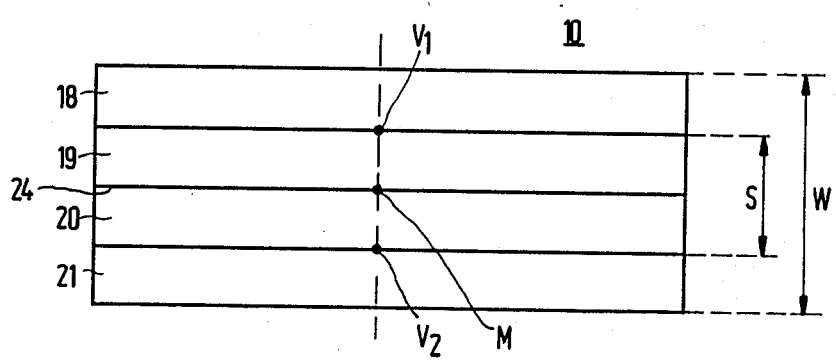
FIG. 4 shows the radiation-sensitive detection system used in the apparatus according to FIG. 2.

According to the invention the detector geometry shown in perspective in FIG. 2 and in a plan view in FIG. 4 is used.

In the composite detector 10 of FIG. 4 the angle $\phi$ is equal or substantially equal to zero; in other words, the separating strips 22 and 23 are parallel to each other and to the separating strip 24 and the connection line CL. A less stringent requirement is then to be imposed on the distance $Y_t$ between the points M and 0. Moreover, the apparatus is then less sensitive to a tilt of the composite detector 10 about the Y axis.

In FIG. 4 the reference symbol W denotes the overall width of the composite detector 10 and S denotes the nominal distance between the radiation spots $V_1$ and $V_2$ in the plane of the detector 10. The nominal distance S is the distance between the positions occupied by the radiation spots $V_1$ and $V_2$ if the scanning beam is sharply focused on the information plane 2. The two detector pairs 18, 19 and 20, 21 can be arranged against each other but also at some distance from each other, as is shown in FIG. 4 and FIG. 2, respectively. The following considerations play a role in the design of the composite detector 10.

With a view to optimum detector signals, it is desirable for the different detectors to have the same size. If the detector pairs are arranged against each other, this means that W=2S. The values of W and S are the result of a compromise. On the one hand, the width of the detector 10 should be as small as possible in order that a minimum possible quantity of stray light will reach the composite detector. On the other hand W should be as large as possible in order that the focusing error detection system has a maximum possible capture range. For S it holds that its value should not be too small because interference phenomena may then occur between the radiations of the radiation spots $V_1$ and $V_2$. In fact, these spots are not punctiform, sharply defined spots but are somewhat extended with an intensity decreasing from the centre to the exterior. On the other hand S should not be too large because later on, in the further design of the apparatus, it may appear that such displacements in, for example the X and Y directions, of optical elements, for example the grating 9, should be carried out so that aberrations may occur, resulting in the slope of the focusing error signal curve around zero becoming smaller.

An advantage of the composite detector with parallel separating strips may be that this detector can more easily be made with the required accuracy, particularly with respect to the distance S, as compared with a detector having oblique separating strips.

Figure 5:
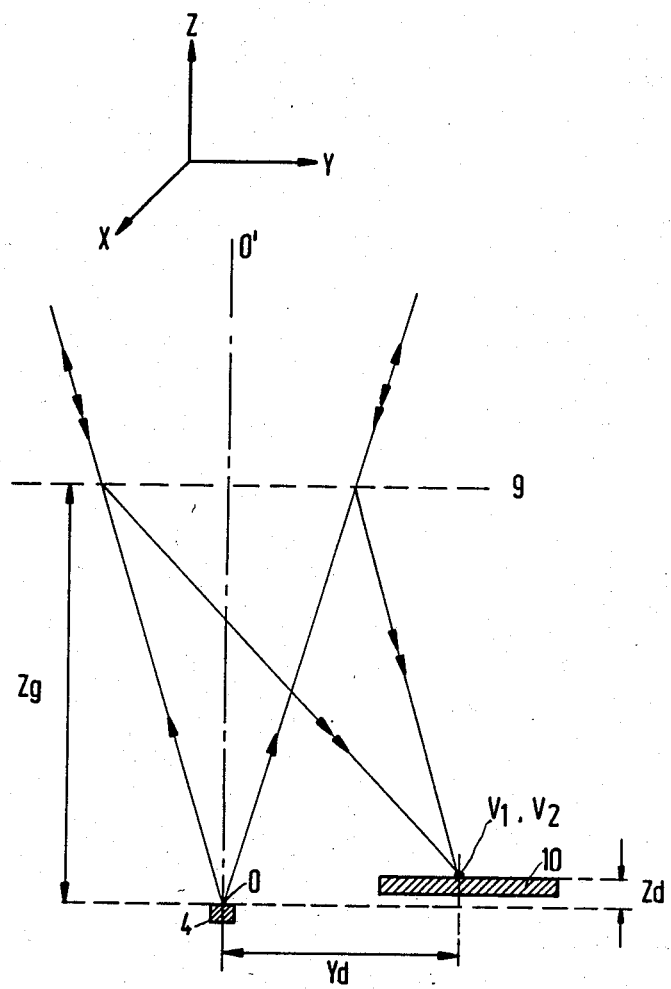
FIG. 5 is a basic diagram of the apparatus, in which the adjustable parameters have been indicated.

FIG. 5 shows the parameters between which, with the choice for $\phi=0$ being made, a choice can still be made to obtain the desired optimization of the apparatus. In this Figure the centre of the radiation-emitting surface of the diode laser 4 is considered to be located in the origin 0 of the system of coordinates X Y Z. $Y_d$ and $Z_d$ are the distances along the Y and Z axes between the centre M of the detector 10 and the point 0. In principle, these distances can be freely chosen. In practice a combination of a diode laser and a photodiode will mostly be used, which elements are mounted on one block so that the choices for $Y_d$ and $Z_d$ are limited. Preferably by displacing the grating 9 along the X and Y axes and rotating it about the Z axis it can be ensured that the radiation spots $V_1$ and $V_2$ occupy the desired positions on the composite detector 10.

Figure 6:
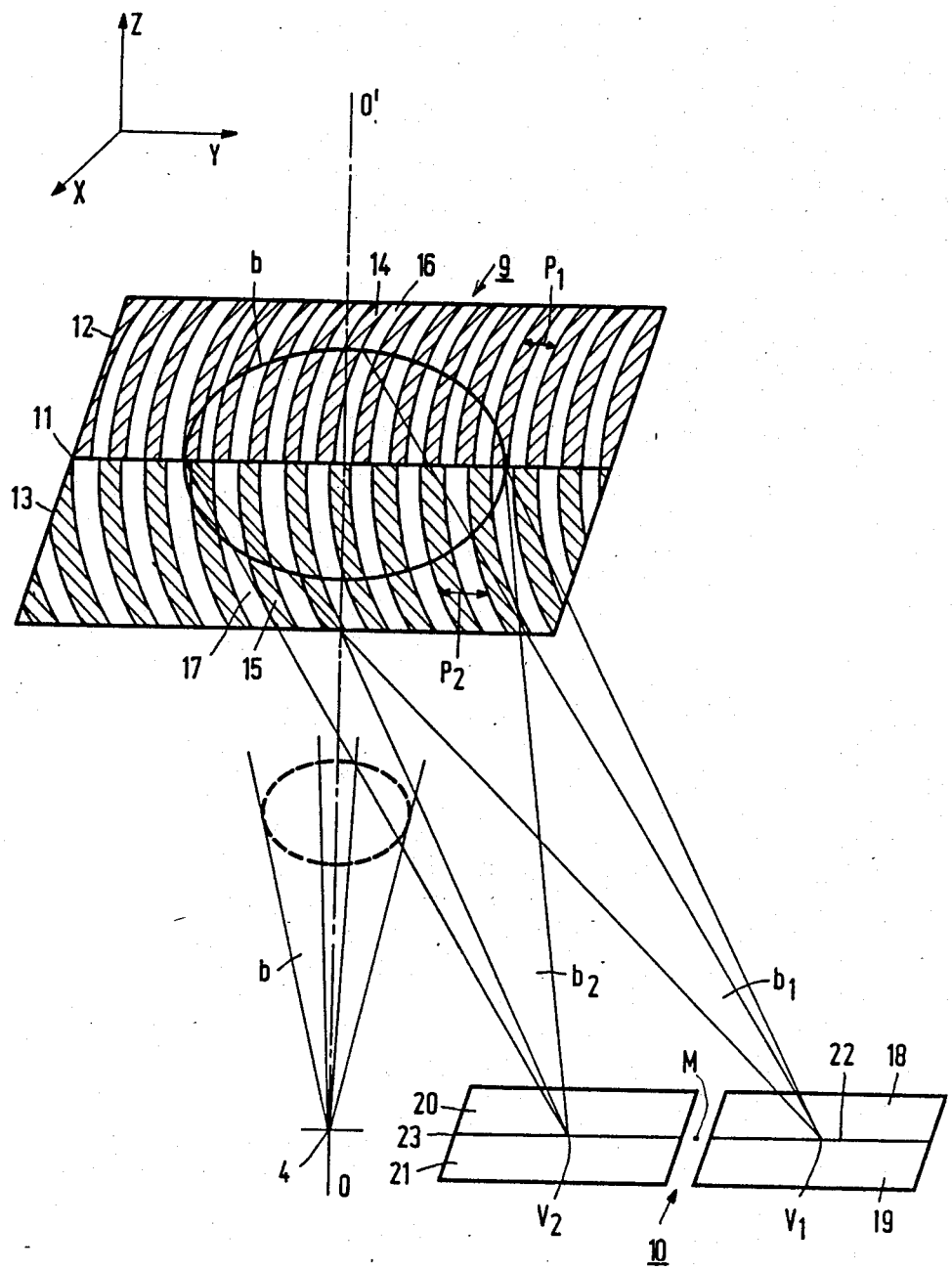
FIG. 6 shows a second embodiment of the detection system and the associated diffraction grating.

FIG. 6 shows a second embodiment of the apparatus according to the invention. The main directions of the preferably curved grating strips of the two sub-gratings 12 and 13 now extend at the same angles to the bounding line 11, while the average grating periods of the two sub-gratings are different. Consequently, the angle at which the sub-beam $b_2$ is diffracted in the YZ plane is different from the angle at which $b_1$ is diffracted. This means that the radiation spots $V_1$ and $V_2$ are displaced relative to each other in the Y direction in the plane XY of the detectors.

Figure 7:
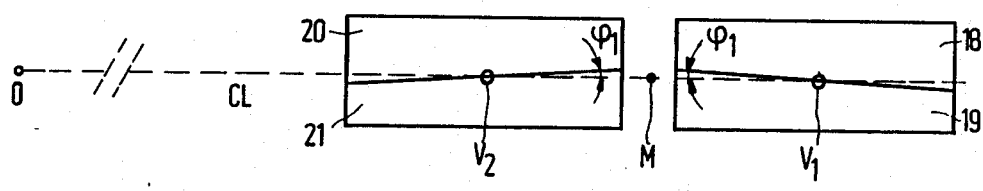
FIG. 7 is an alternative to the detection system of FIG. 6.

As far as its operation is concerned, the apparatus according to FIG. 6 is largely analogous to that according to FIG. 2 so that it need not be described. If the separating strips 22 and 23 of the detector 10 in FIG. 6 are parallel to each other ($\phi=0$), as is proposed in the present invention, the focusing error signal can be independent of the scanning beam wavelength variation to such an extent that it is acceptable in practice. If it is desired under circumstances to still further reduce this dependence, the bounding lines 22 and 23 can be positioned at a very small angle $\phi_1$ of the order of 0.1° relative to the connection line CL between the points M and 0, as is shown in FIG. 7. Due to the very small value of the angle $\phi_1$ one remains within the scope of the present invention.

It is to be noted that, since the efficiency of a diffraction grating, i.e. the quotient of the amount of radiation diffracted in the desired direction and the total amount of radiation incident on the grating depends inter alia on the grating period, the composite diffraction grating according to FIG. 2 is preferred to that according to FIG. 6 or 7. In fact, due to the unequal grating periods of the sub-gratings in the last-mentioned gratings, the sub-beams may acquire unequal intensities so that an offset may be produced in the tracking error signal.

This type of offset cannot occur in an apparatus using the diffraction grating of FIG. 2.

Figure 8:
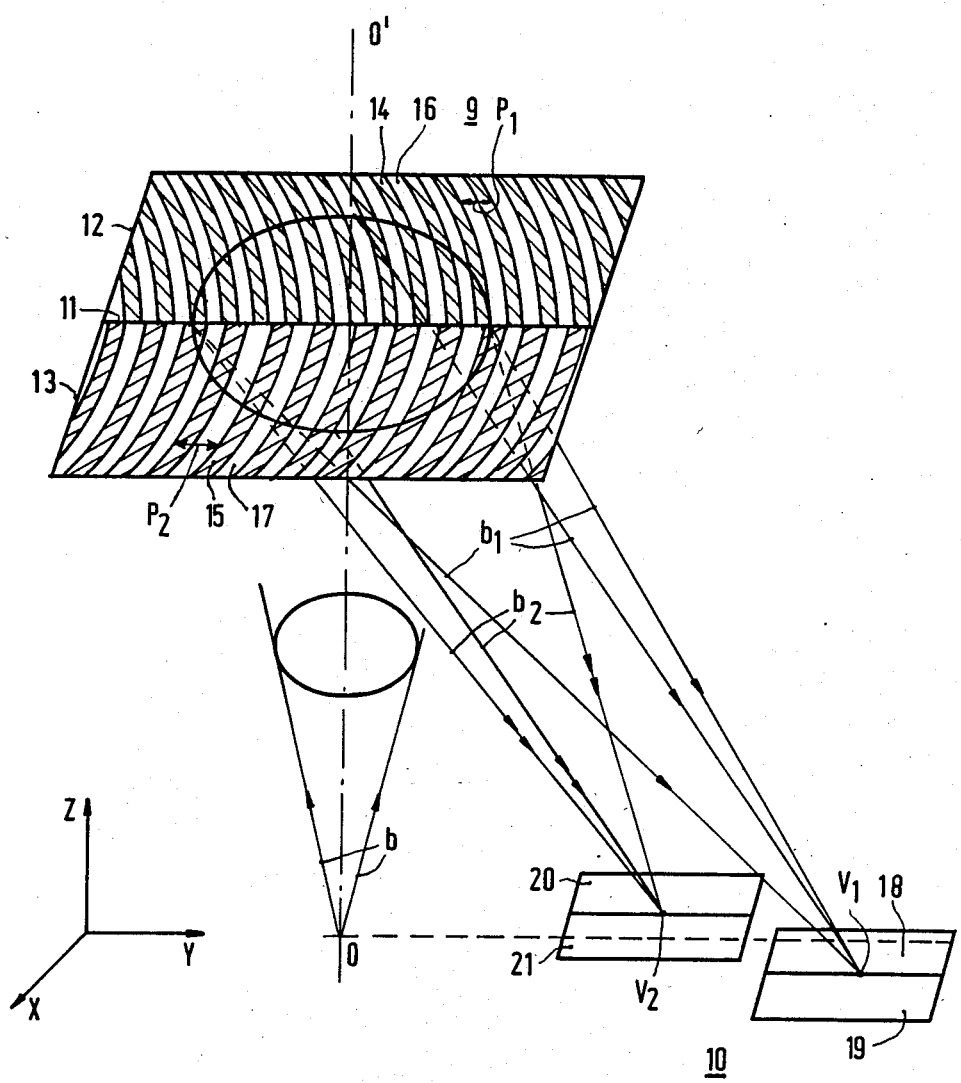
FIG. 8 shows a third embodiment of the detection system and the associated diffraction grating.

FIG. 8 shows a third embodiment of the apparatus according to the invention. Again, the grating 9 comprises two sub-gratings 12 and 13. However, both the grating period and the main direction of the preferably curved grating strips of the two sub-gratings are different. The operation of this grating may be assumed to be a combination of that of the gratings of FIGS. 2 and 6. Consequently, the sub-beam $b_1$ is diffracted by the grating of FIG. 8 both in the XZ plane and the YZ plane through a different angle than the sub-beam $b_2$. In the plane XY of the composite detector 10 the radiation spots $V_1$ and $V_2$ are displaced relative to each other both in the X and the Y directions. It will be evident that also the detector pairs 18, 19 and 20, 21 in the X and Y directions are displaced relative to each other. According to the invention the separating strips 22 and 23 are parallel to each other, while the apparatus is still satisfactorily corrected for wavelength variations of the scanning beam b.

The invention can be used in any focusing error detection system in which a diffraction element is used for separating the beam reflected by the information plane and the beam emitted by the diode laser and for splitting the reflected beam into a plurality of sub-beams. In practice, two sub-beams are mostly used which are formed by means of two sub-gratings. Under circumstances it may be desirable to use a composite grating having more than two sub-gratings so that more than two sub-beams are formed. The measure according to the invention can be taken for each of the detector pairs associated with these sub-beams. The sub-gratings may be straight grating lines and may have a constant grating period. However, preferably a type of grating, also referred to as holograms, is used, embodiments of which are shown in FIGS. 2, 6 and 8. Their sub-gratings have a varying grating period, the variation in the period being, for example of the order of a few percents of the average grating period. Moreover, the grating strips of the two sub-gratings are curved, as is shown in FIGS. 2, 6 and 8. Thus, these sub-gratings have a variable lens action. Due to the varying grating period the positions of the radiation spots $V_1$ and $V_2$ can be varied by displacing the grating 9 in its own plane. Aberrations in a direction perpendicular to the direction of the bounding line 11 can be minimized by the curvatures of the grating strips. The possibility of moving the positions of the radiation spots $V_1$ and $V_2$ is particularly important if an integrated laser-photodiode unit is used, i.e. a component in which the diode laser and the photodetectors are arranged on one support and are therefore fixed relative to each other and thus have a fixed mutual distance in the Z direction. This distance is subject to manufacturing tolerances and cannot be corrected during assembly of the apparatus by displacing the photodiodes relative to the laser diode in the Z direction.

In the embodiments according to FIGS. 6 and 8 it can be ensured that in spite of the different angles at which the sub-beams $b_1$ and $b_2$ are diffracted in the YZ plane due to the different average grating periods of the sub-gratings 12 and 13, the foci of the sub-beams are located in one XY plane, namely by giving the grating periods and the curvatures of the grating strips of corresponding portions of the sub-gratings a different variation.

An important advantage of the diffraction grating having curved grating strips as compared with a grating having straight grating strips is that the optical aberrations such as coma and astigmatism, which may occur when using the last-mentioned grating, can be avoided in the first-mentioned grating by taking these aberrations into account when manufacturing this grating and by adapting the curvatures of the grating strips to these aberrations.

The invention has been described for use in a read apparatus, but it may alternatively be used in a write apparatus or in a combined write-read apparatus in which during recording the focusing and the tracking of the write beam are monitored. The focus-error detection system described here does not utilize special properties of the information surface 2. It is merely necessary and adequate that this surface is reflecting. Therefore, the invention may be used in various apparatuses where a very accurate focusing is required, for example in microscopes, in which case the tracking error detection may be dispensed with.

We claim:

1. An apparatus for optically scanning a radiation-reflecting information plane, which apparatus comprises a diode laser supplying a scanning beam, an objective system for focusing the scanning beam to a scanning spot in the information plane and for re-imaging the scanning spot on a composite radiation-sensitive detection system, and a composite diffraction element arranged in the radiation path between the diode laser and the objective system for deflecting a part of the radiation beam reflected by the information plane towards the radiation-sensitive detection system and for splitting the deflected beam into a plurality of sub-beams which respectively form respective radiation spots re-imaged on respective detector pairs of the composite detection system, the two detectors of each pair having a separating strip there-between which is oriented so that displacements of the re-imaged radiation spot thereon resulting from wavelength variations of the scanning beam do not have any influence on the detector signals; characterized in that the separating strips of the detector pairs are substantially parallel to a connecting line from the centre of the radiation-emitting surface of the diode laser to the centre of the composite radiation-sensitive detection system.

2. An apparatus as claimed in claim 1, in which the diffraction element is a diffraction grating comprising two sub-gratings with a bounding line there-between, characterized in that the sub-gratings have a varying grating period and in that the grating strips are curved.

3. An apparatus as claimed in claim 1, or 2 in which the diffraction element is a diffraction grating comprising two sub-gratings with a bounding line there-between, characterized in that the two sub-gratings have the same average period, the main directions of the grating strips of the first sub-grating extend at a first angle and those of the grating strips of the second sub-grating extend at a second, opposite angle to said bounding line of the two sub-gratings, and the detector pairs are juxtaposed in a direction transversely of the direction of the said bounding line.

4. An apparatus as claimed in claim 1 or 2, in which the diffraction element is a diffraction grating comprising two sub-gratings with a bounding line there-between, characterized in that the grating strips of the one sub-grating have the same main direction as those of the other sub-grating, the average grating periods of the sub-gratings are different, the detector pairs are juxtaposed in a direction parallel to said bounding line between the sub-gratings, and the separating strips of the detector pairs are located on the said connection line.

5. An apparatus as claimed in claim 1 or 2, in which the diffraction element is a diffraction grating comprising two sub-gratings having a bounding line therebetween, characterized in that the grating strips of the one sub-grating have the same main direction as those of the other sub-grating, the average grating periods of the sub-gratings are different, the detector pairs are juxtaposed in a direction parallel to said bounding line between the sub-gratings, and the separating strips of the detector pairs extend at equal but opposite angles of the order of 0.1° to the said connection line.

6. An apparatus as claimed in claim 1 or 2, in which the diffraction element is a diffraction grating comprising two sub-gratings having a bounding line therebetween, characterized in that the main directions of the grating strips of the first sub-grating extend at a first angle and those of the grating strips of the second sub-grating extend at a second, opposite angle to said bounding line between the sub-gratings, the average grating periods of the two sub-gratings are different, and the respective detector pairs occupy different positions both in a direction parallel to and in a direction perpendicular to the said bounding line.

* * * * *